(12) United States Patent
Wilke

(10) Patent No.: US 6,512,044 B1
(45) Date of Patent: Jan. 28, 2003

(54) COATING AGENT, METHOD FOR PRODUCING SAID COATING AGENT AND USE OF THE SAME AS A COATING LACQUER OR A CLEAR LACQUER, ESPECIALLY FOR COATING PLASTICS

(75) Inventor: Guido Wilke, Münster (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/806,819

(22) PCT Filed: Sep. 27, 1999

(86) PCT No.: PCT/EP99/07163

§ 371 (c)(1),
(2), (4) Date: May 15, 2001

(87) PCT Pub. No.: WO00/22020

PCT Pub. Date: Apr. 20, 2000

(30) Foreign Application Priority Data

Oct. 12, 1998 (DE) .......................................... 198 46 971

(51) Int. Cl.$^7$ .............................. C08J 3/00; C08K 3/20; C08L 75/00
(52) U.S. Cl. .......................... 524/589; 524/86; 524/100; 524/102; 524/507; 524/539; 524/590; 524/591; 524/839; 524/840; 525/123; 525/127; 525/455
(58) Field of Search ................................. 525/123, 127, 525/455; 524/86, 507, 589, 539, 590, 591, 839, 840, 100, 102

(56) References Cited

U.S. PATENT DOCUMENTS

| | | | |
|---|---|---|---|
| 4,754,014 A | 6/1988 | Ryntz et al. | 528/28 |
| 5,145,839 A | 9/1992 | Beljanski | 514/27 |
| 5,504,178 A | 4/1996 | Shaffer et al. | 528/45 |

FOREIGN PATENT DOCUMENTS

| | | | | |
|---|---|---|---|---|
| DE | 31 09 604 A1 | 3/1981 | ........... | B32B/27/30 |
| DE | 37 06 095 A1 | 2/1987 | ........... | C08G/77/20 |
| DE | 38 07 571 A1 | 3/1988 | ........... | C08L/83/07 |
| DE | 40 24 204 A1 | 7/1990 | ......... | C09D/175/04 |
| DE | 43 26 670 A1 | 8/1993 | ........... | C08G/18/08 |
| DE | 44 21 823 A1 | 6/1994 | ......... | C09D/175/04 |
| DE | 197 23 504 C1 | 6/1998 | ......... | C09D/175/06 |
| EP | 0 518 779 A1 | 6/1992 | ......... | C09D/175/00 |
| EP | 0 604 922 A1 | 12/1993 | ......... | C08K/5/3492 |
| EP | 0 358 153 B1 | 1/1994 | ......... | C09D/143/04 |
| EP | 0 653 468 A2 A3 | 11/1994 | ......... | C09D/133/04 |
| EP | 0 455 211 B1 | 4/1995 | ............ | C09D/5/00 |
| WO | WO 92/02590 | 2/1992 | ......... | C09D/133/08 |
| WO | WO 98/02495 | 2/1992 | ......... | C09D/201/06 |
| WO | WO 92/22615 | 12/1992 | ......... | C09D/151/08 |
| WO | WO 96/34924 | 11/1996 | ......... | C09D/133/06 |

*Primary Examiner*—Patrick D. Niland

(57) ABSTRACT

The present invention provides a coating composition comprising
- a) one or more polyester resins (A),
- b) one or more polyacrylate resins (B),
- c) one or more di- and/or polyisocyanates (C) having free or blocked isocyanate groups,
- d) one or more light stabilizers (L1) based on a UV absorber,
- e) one or more light stabilizers (L2) based on sterically hindered amines, and
- f) one or more organic solvents (D), where
1.) the polyester (A) has an OH number of from 80 to 200 mg KOH/g and an acid number <10 mg KOH/g,
2.) the polyacrylate resin (B) has an OH number of from 80 to 200 mg KOH/g and an acid number <20 mg KOH/g,
3.) the light stabilizer (L2) based on sterically hindered amines is amino ether functionalized, and
4.) the light stabilizer (L1) is included herein in an amount of at least 3% by weight, based on the coating composition.

23 Claims, No Drawings

COATING AGENT, METHOD FOR PRODUCING SAID COATING AGENT AND USE OF THE SAME AS A COATING LACQUER OR A CLEAR LACQUER, ESPECIALLY FOR COATING PLASTICS

The present invention provides a polyurethane coating composition comprising a) one or more polyester resins (A),
b) one or more polyacrylate resins (B),
c) one or more di- and/or polyisocyanates (C) having free or blocked isocyanate groups,
d) one or more light stabilizers (L1) based on a UV absorber,
e) one or more light stabilizers (L2) based on sterically hindered amines, and
f) one or more organic solvents (D).

The present invention further relates to processes for preparing the coating composition and to the use of the coating composition as a topcoat or clearcoat, especially for coating plastics.

In industry today there is increasing use of shaped components which are based on plastic, are used together with metal components, and require coating. This applies in particular to automotive components, which are being manufactured from plastics parts to an increasing extent: examples are bumper linings, spoilers, sills, wheel-arch linings and side trims or protection strips. For shaped components of this kind use is increasingly being made of plastics comprising polycarbonate and polycarbonate blends, preferably with a polycarbonate content of more than 5% by weight, based on the plastics fraction.

Plastics, however, are generally sensitive to the effects of weathering, such as UV radiation and moisture, and when exposed in this way exhibit a variety of problems, such as yellowing, embrittlement or cracking, for example, unless appropriate precautions are taken. In order to avoid these problems it is known, for example, to provide plastics that are exposed to the effects of weathering as a result of their use, for example, as exterior automotive components with clearcoats or topcoats. It is common to add light stabilizers to the coating materials employed for this purpose, in order to avoid or at least reduce the problems caused by UV radiation.

The requirements made of such light stabilizers are diverse. For instance, these additives should not have an adverse impact on the mechanical and chemical properties of the coating material. In addition, these additives should be chemically stable and stable to UV radiation and should also be light in color, stable in shade, easy to incorporate, and compatible with the other components of the coating material. A large number of different light stabilizers and their use in coating materials are already in fact known.

For example, various benzophenone derivatives, benzotriazole derivatives, triazines, acrylates, salicylates, oxazolines, organic nickel compounds, ferrocene derivatives, sterically hindered amines and the like are used, individually or in combination, as light stabilizers.

Despite the large number of known light stabilizers and known clearcoat systems there are still great problems in the coating of colored thermoplastics as are used in particular for exterior automotive components of large surface area. In addition to the weathering stability already mentioned, the coating materials employed are in fact required at the same time to exhibit good adhesion to the plastics substrates and to result in a hydrolysis-resistant system (i.e., good adhesion after moisture exposure) having good chemical resistance and good strength at room temperature, and exhibiting a ductile fracture behavior even at low temperatures of from −20 to −30° C. In the sector of the coating of plastics, furthermore, there is the additional requirement that the coating compositions used are curable at low temperatures (generally <100° C.) and even when cured at these low temperatures lead to films having the desired properties.

DE-A-43 26 670 discloses a polyurethane coating composition based on a hydroxybutyl (meth)acrylate-containing polyacrylate resin and, if desired, further polyacrylate resins and/or polycondensation resins and polyisocyanates as crosslinkers and also discloses the use thereof as a clearcoat in the field of automotive refinishing and for coating plastics. As light stabilizers, the clearcoat comprises a mixture of benzotriazine as UV absorber and a light stabilizer based on sterically hindered amines (Tinuvin® 292 from Ciba Geigy, light stabilizer based on bis(1,2,2,6,6-pentamethyl-4-piperidyl)sebacate).

EP-B-0 455 211, finally, discloses an effect basecoat for the direct coating of unprimed plastics substrates consisting of or comprising polypropylene. Said effect basecoat described therein comprises not only physically drying binders but also cellulose acetobutyrate and from 0.5 to 15% by weight of one or more chlorinated polyolefins. Clearcoats and topcoats, however, are not described in EP-B-0 455 211.

U.S. Pat. No. 5,145,839 discloses coating compositions which comprise mixtures of the light stabilizers (L1) and (L2), in an amount of from 0.2 to 20% by weight, based on the film-forming resins. The amounts of the light stabilizer (L1) are not more fully specified; the examples only reveal that less than 2% by weight, based on the total coating composition, is used. Additionally, it is not stated which specific binder combinations are to be used. The coating compositions may be used to coat plastics.

U.S. Pat. No. 5,504,178 or DE-A-31 09 604 describes coating compositions which comprise polyester resins (A) and polyacrylate resins (B) as binders, polyisocyanates as crosslinkers, and light stabilizers (L1). Light stabilizers (L2) are not present therein. These coating compositions may also be used to coat plastics.

EP-A-0 518 779 discloses a coating composition for the coating of plastics which comprises a polyester polyol (A) and/or a polyether polyol as binder(s), triisocyanates as crosslinkers, and a combination of sterically hindered amines (HALS) and light stabilizers (L1).

However, the color stability following radiation exposure of the coatings produced from these known coating compositions still leaves much to be desired, a further difficulty being that the radiation exposure results in the formation of cracks in the coatings.

It is an object of the present invention therefore to provide coating compositions which combine good weathering stability of the resulting coatings with good adhesion to the plastics substrates and which lead to a hydrolysis-resistant system (i.e., good adhesion after moisture exposure) having good chemical resistance and good strength at room temperature, said system also exhibiting a ductile fracture behavior at low temperatures of from −20 to −30° C. Moreover, the ovel coating compositions as clearcoat material should bring about a much higher color stability following radiation exposure in the colored plastics parts or in the basecoats and, viewed per se, should be less susceptible to cracking than the conventional coating compositions.

This object is surprisingly achieved by means of a coating composition, of the type specified at the outset, wherein 1.) the polyester (A) has an OH number of from 80 to 200 mg KOH/g and an acid number <10 mg KOH/g, 2.) the polyacrylate resin (B) has an OH number of from 80 to 200 mg KOH/g and an acid number <20 mg KOH/g, 3.) the light stabilizer (L2) based on sterically hindered amines is amino ether functionalized, and 4.) the light stablizer (L1) is included herein in an amount of at least 3% by weight, based on the coating composition.

The present invention further provides processes for preparing this coating composition and provides for the use of this coating composition as a topcoat or clearcoat, especially for coating plastics.

It is surprising and was not foreseeable that by the use of a specific binder combination and, at the same time, a specific light stabilizer combination it is possible to provide coating compositions which are suitable as protective coating for color-pigmented plastics and meet all of the requirements commonly imposed on such coating compositions. Thus the coatings produced using these coating compositions are notable for good weathering stability coupled with good adhesion to the plastics substrates. In addition, they lead to a hydrolysis-resistant system (i.e., good adhesion after moisture exposure) having good chemical resistance and good strength at room temperature and exhibiting a ductile fracture behavior even at low temperatures from −20 to −30° C.

In the text below, the individual components of the coating composition of the invention are first of all elucidated.

It is essential to the invention that the coating composition comprises as binder a mixture of a) at least one polyester (A) having an OH number of from 80 to 200 mg KOH/g, preferably from 130 to 180 mg KOH/g, and having an acid number <10 mg KOH/g, preferably <5 mg KOH/g, and b) at least one polyacrylate resin (B) having an OH number of from 80 to 200 mg KOH/g, preferably from 100 to 150 mg KOH/g, and an acid number <20 mg KOH/g, preferably <10 mg KOH/g.

The coating composition preferably comprises the polyester or polyesters (component (A)) and the polyacrylate resin or resins (component (B)) in amounts such that the mixture consists of a) from 40 to 80% by weight, preferably from 55 to 70% by weight, of component (A), and b) from 60 to 20% by weight, preferably from 45 to 30% by weight, of component (B), the figures being based in each case on the solids content of the resins and the sum of the percentages by weight of components (A) and (B) being in each case 100% by weight.

Preferably, the binders are further used in the coating composition of the invention in amounts such that the sum of the amount of polyesters (A) employed and the amount of polyacrylate resins (B) employed is from 30 to 70% by weight, with particular preference from 40 to 60% by weight, based in each case on the solids content of the binders and on the overall weight of the stock coating material (i.e., coating composition minus crosslinker component (C)).

All polyesters having the abovementioned OH numbers and acid numbers are suitable in principle for use in the coating compositions of the invention. The polyesters (A) preferably have a number-average molecular weight of from 700 to 1500.

It is preferred to use polyesters obtainable by reacting p1) di- and/or polycarboxylic acids or their esterifiable derivatives, together if desired with monocarboxylic acids, p2) diols, p3) polyols, together if desired with monools, and p4) if desired, further modifying components.

Particular preference is given to the use here of polyesters which have been prepared without using monools and monocarboxylic acids. Likewise with particular preference, the polyesters are free from unsaturated fatty acids.

Examples which may be mentioned of di- and polycarboxylic acids which can be used as component (p1) are aromatic, aliphatic and cycloaliphatic di- and polycarboxylic acids. As component (p1) it is preferred to use aromatic di- and polycarboxylic acids, together if desired with aliphatic di- and polycarboxylic acids. Examples of suitable polycarboxylic acids are phthalic acid, isophthalic acid, terephthalic acid, halophthalic acids, such as tetrachloro- and tetrabromophthalic acid, adipic acid, glutaric acid, azelaic acid, sebacic acid, fumaric acid, maleic acid, trimellitic acid, pyromellitic acid, tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid, cyclobutanetetracarboxylic acid and others. The cycloaliphatic polycarboxylic acids can be used both in their cis form and in their trans form and as a mixture of both forms. Also suitable are the esterifiable derivatives of the abovementioned polycarboxylic acids, such as, for example, their monoesters or polyesters with aliphatic alcohols having 1 to 4 carbon atoms or hydroxy alcohols having 1 to 4 carbon atoms. Furthermore, it is also possible to use the anhydrides of the abovementioned acids where they exist.

Examples of monocarboxylic acids which can be used together if desired with the polycarboxylic acids are benzoic acid, tert-butylbenzoic acid, lauric acid, isononanoic acid and hydrogenated fatty acids of naturally occurring oils, preferably isononanoic acid.

Examples of suitable diols (p2) for preparing the polyester (A) are ethylene glycol, propanediols, butanediols, hexanediols, neopentyl glycol hydroxypivalate, neopentyl glycol, diethylene glycol, cyclohexanediol, cyclohexanedimethanol, trimethylpentanediol and ethylbutylpropanediol. Also suitable are aliphatic polyetherdiols, such as linear or branched poly(oxyethylene) glycols, poly (oxypropylene) glycols and/or poly(oxybutylene) glycols and mixed polyetherdiols such as poly (oxyethyleneoxypropylene) glycols. The polyetherdiols usually have a molar mass Mn of from 400 to 3000.

Further diols which can be used are aromatic or alkylaromatic diols, such as 2-alkyl-2-phenylpropane-1,3-diol, bisphenol derivatives with ether functionality, etc.

Further suitable diols include esters of hydroxycarboxylic acids with diols, where the diol used can be the abovementioned diols. Examples of hydroxycarboxylic acids are hydroxypivalic acid or dimethylolpropanoic acid.

Examples of polyols suitable as component (p3) are ditrimethylolpropane, trimethylolethane, trimethylolpropane, glycerol, pentaerythritol, homopentaerythritol, dipentaerythritol, trishydroxyethyl isocyanate, 1,2,4-butanetriol, propane- and hexanetriols, trihydroxycarboxylic acids, such as trishydroxymethyl(ethyl) ethanoic acids. The polyols having at least three OH groups can be used alone or as a mixture. If desired the triols can be used together with monohydric alcohols, such as butanol, octanol, lauryl alcohol, cyclohexanol, tert-butylcyclohexanol, ethoxylated and propoxylated phenols, for example.

Compounds particularly suitable as component (p4) for preparing the polyesters (A1) are those having a group which is reactive with respect to the functional groups of the polyester. As modifying component (p4) it is possible to use diepoxide compounds, possibly monoepoxide compounds as well. Suitable components (p4) are described, for example, in DE-A-40 24 204 on page 4, lines 4 to 9.

Also suitable as component (p4) for preparing the polyesters (A) are compounds which have a tertiary amino group in addition to a group which is reactive with respect to the functional groups of the polyester (A), examples being monoisocyanates having at least one tertiary amino group or mercapto compounds having at least one tertiary amino group. For details reference is made to DE-A-40 24 204, page 4, lines 10 to 49.

The polyesters (A) are prepared in accordance with the known methods of esterification, as is described, for example, in DE-A-40 24 204, page 4, lines 50 to 65. The reaction takes place in this case usually at temperatures between 180 and 280 degrees C., if desired in the presence of a suitable esterification catalyst, such as lithium octoate, dibutyltin oxide, dibutyltin dilaurate, para-toluenesulfonic acid and the like, for example.

The preparation of the polyesters (A) is usually carried out in the presence of small amounts of a suitable solvent as entrainer. Examples of entrainers used are aromatic hydrocarbons, such as xylene in particular, and (cyclo) aliphatic hydrocarbons, e.g., cyclohexane. In addition, however, it is also possible to prepare the polyesters without solvent (reaction in bulk).

Also suitable in principle for use in the coating compositions of the invention are all polyacrylate resins (B) having the abovementioned OH numbers and acid numbers. The polyacrylate-resins preferably have a number-average molecular weight of from 2500 to 5000.

It is preferred, furthermore, to use polyacrylate resins which include in copolymerized form glycidyl esters of carboxylic acids branched on the α carbon atom (e.g., the glycidyl esters available commercially under the name Cardura®).

Particular preference is given to using polyacrylate resins (B) obtainable by polymerizing a) a (meth)acrylic ester, or a mixture of such monomers, which is essentially free from acid groups and is copolymerizable with but different from (a2), (a3), (a4), (a5) and (a6), a2) an ethylenically unsaturated monomer, or mixture of such monomers, which carries at least one hydroxyl group per molecule and is essentially free from acid groups and is different from (a5) and copolymerizable with (a1), (a3), (a4), (a5) and (a6), a3) an ethylenically unsaturated monomer, or mixture of such monomers, which carries per molecule at least one acid group which can be converted to the corresponding acid anion group, and which is copolymerizable with (a1), (a2), (a4), (a5) and (a6), (a4) if desired, one or more vinylaromatic hydrocarbons, (a5) at least one reaction product of acrylic acid and/or methacrylic acid with the glycidyl ester of an alpha-branched monocarboxylic acid having 5 to 18 carbon atoms per molecule or, instead of the reaction product, an equivalent amount of acrylic and/or methacrylic acid which is then reacted, during or after the polymerization reaction, with the glycidyl ester of an alpha-branched monocarboxylic acid having 5 to 18 carbon atoms per molecule, a6) if desired, an ethylenically unsaturated monomer, or mixture of such monomers, which is essentially free from acid groups and is copolymerizable with (a1), (a2), (a3), (a4) and (a5), but different from (a1), (a2), (a4) and (a5), in an organic solvent or a solvent mixture and in the presence of at least one polymerization initiator and, if desired, in the presence of regulators, the nature and amount of (a1), (a2), (a3), (a4), (a5) and (a6) being selected such that the polyacrylate resin (B) has the desired OH number, acid number and the desired molecular weight.

In order to prepare the polyacrylate resins used in accordance with the invention it is possible as component (a1) to use any ester of (meth)acrylic acid which is essentially free from acid groups and is copolymerizable with (a2), (a3), (a4), (a5) and (a6), or a mixture of such (meth)acrylic esters. Examples are alkyl acrylates and alkyl methacrylates having up to 20 carbon atoms in the alkyl radical, such as methyl, ethyl, propyl, butyl, hexyl, ethylhexyl, stearyl and lauryl acrylate and methacrylate and cycloaliphatic (meth)acrylic esters, such as cyclohexyl (meth)acrylate, isobornyl (meth)acrylate, dicyclopentaene (meth)acrylate, and tert-butylcyclohexyl (meth)acrylate, for example.

As component (a1) it is also possible to use ethyltriglycol (meth)acrylate and methoxyoligoglycol (meth)acrylate having a number-average molecular weight Mn of preferably 550 or other ethoxylated and/or propoxylated hydroxyl-free (meth)acrylic acid derivatives.

As component (a2) it is possible to use ethylenically unsaturated monomers which carry at least one hydroxyl group per molecule and are essentially free from acid groups, or a mixture of such monomers, which are copolymerizable with (a1), (a2), (a3), (a4), (a5) and (a6) and different from (a5). Examples are hydroxyalkyl esters of acrylic acid, methacrylic acid or another alpha,beta-ethylenically unsaturated carboxylic acid. These esters can be derived from an alkylene glycol which is esterified with the acid or can be obtained by reacting the acid with an alkylene oxide. As component (a2) it is preferred to use hydroxyalkyl esters of acrylic acid or methacrylic acid in which the hydroxyalkyl group contains up to 20 carbon atoms, reaction products of cyclic esters, such as epsilon-caprolactone and these hydroxyalkyl esters, or mixtures of these hydroxyalkyl esters and/or epsilon-caprolactone-modified hydroxyalkyl esters.

Examples of hydroxyalkyl esters of this kind are 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate, 4-hydroxybutyl methacrylate, hydroxystearyl acrylate and hydroxystearyl methacrylate. Corresponding esters of other unsaturated acids, such as ethacrylic acid, crotonic acid and similar acids having up to about 6 carbon atoms per molecule, for example, can also be used.

As component (a2) it is also possible, furthermore, to use olefinically unsaturated polyols. Preferred polyacrylate resins (B) are obtained if trimethylolpropane monoallyl ether is used at least in part as component (a2). The fraction of trimethylolpropane monoallyl ether is customarily from 2 to 10% by weight, based on the overall weight of the monomers (a1) to (a6) used to prepare the polyacrylate resin. In addition to this, however, it is also possible to add from 2 to 10% by weight, based on the overall weight of the monomers used to prepare the polyacrylate resin, of trimethylolpropane monoallyl ether to the finished polyacrylate resin.

The olefinically unsaturated polyols, such as trimethylolpropane monoallyl ether in particular, can be used as sole hydroxyl-containing monomers or else, in particular, fractionally in combination with other of the abovementioned hydroxyl-containing monomers.

As component (a3) it is possible to use any ethylenically unsaturated monomer or mixture of such monomers carrying at least one acid group, preferably a carboxyl group, per molecule and being copolymerizable with (a1), (a2), (a4), (a5) and (a6). As component (a3) it is particularly preferred to use acrylic acid and/or methacrylic acid. Alternatively, other ethylenically unsaturated carboxylic acids having up to 6 carbon atoms in the molecule can be used. Examples of such acids are ethacrylic acid, crotonic acid, maleic acid, fumaric acid and itaconic acid. It is also possible, for example, to use ethylenically unsaturated sulfonic or phosphonic acids, and/or their partial esters, as component (a3). As component (a3) it is also possible to use maleic acid mono(meth)acryloyloxyethyl ester, succinic acid mono (meth)acryloyloxyethyl ester, and phthalic acid mono(meth) acryloyloxyethyl ester.

As component (a4) use is made of vinylaromatic hydrocarbons, such as styrene, alpha-alkylstyrenes, and vinyltoluene.

As component (a5), the reaction product of acrylic acid and/or methacrylic acid with the glycidyl ester of an alpha-branched monocarboxylic acid having 5 to 18 carbon atoms per molecule is used. Glycidyl esters of highly branched monocarboxylic acids are obtainable under the tradename "Cardura". The reaction of the acrylic or methacrylic acid with the glycidyl ester of a carboxylic acid having a tertiary alpha carbon atom can be carried out before, during or after the polymerization reaction. Preference is given to the use as component (a5) of the reaction product of acrylic and/or methacrylic acid with the glycidyl ester of Versatic acid. This glycidyl ester is available commercially under the name "Cardura E10".

As component (a6) it is possible to use all ethylenically unsaturated monomers or mixtures of such monomers which are essentially free from acid groups, are different from (a1), (a2), (a3) and (a4) and are copolymerizable with (a1), (a2), (a3), (a4) and (a5).

As component (a6) it is possible to use one or more vinyl esters of alpha-branched monocarboxylic acids having 5 to 18 carbon atoms in the molecule. The branched monocarboxylic acids can be obtained by reacting formic acid or carbon monoxide and water with olefins in the presence of a liquid, strongly acidic catalyst; the olefins can be cracking products of paraffinic hydrocarbons, such as mineral oil fractions, and can comprise both branched and straight-chain acyclic and/or cycloaliphatic olefins. The reaction of such olefins with formic acid or with carbon monoxide and water produces a mixture of carboxylic acids in which the carboxyl groups are located predominantly on a quaternary carbon atom. Other olefinic starting materials are, for example, propylene trimer, propylene tetramer, and diisobutylene. Alternatively, the vinyl esters can be obtained in a conventional manner from the acids, e.g., by reacting the acid with acetylene.

Particular preference—owing to their ready availability—is given to the use of vinyl esters of saturated aliphatic monocarboxylic acids having 9 to 11 carbon atoms which are branched on the alpha carbon atom.

As component (a6) it is also possible to use polysiloxane macromonomers in combination with other monomers specified as suitable for use as component (a6). Suitable polysiloxane macromonomers are those having a number-average molecular weight Mn of from 1000 to 40,000 daltons, preferably from 2000 to 10,000 daltons, and on average from 0.5 to 2.5, preferably from 0.5 to 1.5, ethylenically unsaturated double bonds per molecule. Suitable examples are the polysiloxane macromonomers described in DE-A 38 07 571 on pages 5 to 7, in DE-A 37 06 095 in columns 3 to 7, in EP-B 358 153 on pages 3 to 6, and in U.S. Pat. No. 4,754,014 in columns 5 to 9. Also suitable, furthermore, are other acryloxy-silane-containing vinyl monomers having the abovementioned molecular weights and levels of ethylenically unsaturated double bonds, examples being compounds preparable by reacting hydroxy-functional silanes with epichlorohydrin and then reacting the reaction product with methacrylic acid and/or hydroxyalkyl esters of (meth)acrylic acid.

It is preferred as component (a6) to use the polysiloxane macromonomers set out in DE-A 44 21 823.

Examples of polysiloxane macromonomers suitable for use as component (a6) also include the compounds specified in the international patent application having the publication number WO 92/22615 on page 12, line 18, to page 18, line 10.

The amount of the polysiloxane macromonomer or macromonomers (a6) used to modify the acrylate copolymers is less than 5% by weight, preferably from 0.05 to 2.5% by weight, with particular preference from 0.05 to 0.8% by weight, based in each case on the overall weight of the monomers used to prepare the copolymer (B).

Acrylate resins used with particular preference are obtained by polymerizing (a1) from 5 to 50% by weight, preferably from 10 to 40% by weight, of component (a1), (a2) from 3 to 45% by weight, preferably from 15 to 35% by weight, of component (a2), (a3) from 1 to 15% by weight, preferably from 5 to 10% by weight, of component (a3), (a4) from 10 to 50% by weight, preferably from 15 to 45% by weight, of component (a4), (a5) from 3 to 50% by weight, preferably from 15 to 35% by weight, of component (a5), and (a6) from 0 to 30% by weight, preferably from 0 to 25% by weight, of component (a6), the sum of the weight fractions of components (a1) to (a6) being in each case 100% by weight.

The preparation of the polyacrylate resins (B) used in accordance with the invention takes place in an organic solvent or solvent mixture and in the presence of at least one polymerization initiator and, if desired, a regulator. Organic solvents, polymerization initiators and regulators used are those solvents, regulators and polymerization initiators which are customary for the preparation of polyacrylate resins. In this context, the solvents may participate in the reaction with the crosslinking component (C) and so act as reactive diluents.

Examples of useful solvents are butylglycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, trimethylolpropane, ethyl 2-hydroxypropionate and 3-methyl-3-methoxybutanol and also derivatives based on propylene glycol, examples being ethyl ethoxypropionate, isopropoxypropanol, methoxypropyl acetate and the like.

Examples of useful polymerization initiators are initiators which form free radicals, such as tert-butyl peroxyethylhexanoate, benzoyl peroxide, azobisisobutyronitrile and tert-butyl perbenzoate, for example. The initiators are used preferably in an amount of from 2 to 25% by weight, with particular preference from 4 to 10% by weight, based on the overall weight of the monomers.

Examples that may be mentioned of suitable regulators are mercaptans, such as mercaptoethanol, thioglycolic esters, and chlorinated hydrocarbons and the like, for example. The regulators are used preferably in an amount of from 0.1 to 15% by weight, with particular preference from 0.5 to 5% by weight, based on the overall weight of the monomers.

The polymerization is judiciously conducted at a temperature of from 80 to 160 degrees C., preferably from 110 to 160 degrees C.

If desired, the coating compositions may also include from 0 to 25% by weight, based on the weight of the stock coating material minus crosslinker component and based on the solids content, of one or more hydroxylcontaining binders other than the components (A) and (B), such as, for example, hydroxyl-containing polyurethane resins, other polyesters or other acrylate resins.

As crosslinkers (C) the coating compositions of the invention include one or more di- and/or polyisocyanates having free or blocked isocyanate groups. Thus it is possible to use any desired organic polyisocyanates having isocyanate groups attached to aliphatic, cycloaliphatic, araliphatic and/or aromatic structures. Preference is given to the use of polyisocyanates having from 2 to 5 isocyanate groups per molecule. If desired, small amounts of organic solvents, preferably from 1 to 25% by weight, based on pure polyisocyanate, can be added to the polyisocyanates in order thus to improve the ease of incorporation of the isocyanate.

Examples of suitable isocyanates are described for example in "Methoden der organischen Chemie", Houben-Weyl, Volume 14/2, 4$^{th}$ edition, Georg Thieme Verlag, Stuttgart 1963, pages 61 to 70, and by W. Siefken, Liebigs Ann. Chem. 562, 75 to 136. Suitable examples are 1,2-ethylene diisocyanate, 1,4-tetramethylene diisocyanate, 1,6-hexamethylene diisocyanate, 2,2,4- and 2,4,4-trimethyl-1,6-hexamethylene diisocyanate, 1,12-dodecane diisocyanate, ω,ω'-diisocyanatodipropyl ether, cyclobutane 1,3-diisocyanate, cyclohexane 1,3- and 1,4-diisocyanate, 2,2- and 2,6-diisocyanato-1-methylcyclohexane, 3-isocyanatomethyl-3,5,5-trimethylcyclohexyl isocyanate ("isophorone diisocyanate"), 2,5- and 3,5-bis(isocyanatomethyl)-8-methyl-1,4-methanodecahydronaphthalene, 1,5-, 2,5-, 1,6- and 2,6-bis(isocyanatomethyl)-4,7-methanohexahydroindane, 1,5-, 2,5-, 1,6- and 2,6-bis(isocyanato)-4,7-methanohexahydroindane, dicyclohexyl 2,4'- and 4,4'-diisocyanate, 2,4- and 2,6-hexahydrotolylene diisocyanate, perhydro-2,4'- and -4,4'-diphenylmethane diisocyanate, ω,ω'-diisocyanato-1,4-diethylbenzene, 1,3- and 1,4-phenylene diisocyanate, 4,4'-diisocyanatobiphenyl, 4,4'-diiso-cyanato-3,3'-dichlorobiphenyl, 4,4'-diisocyanato-3,3'-dimethoxybiphenyl, 4,4'-diisocyanato-3,3'-dimethylbiphenyl, 4,4'-diisocyanato-3,3'-diphenylbiphenyl, 2,4'- and 4,4'-diisocyanatodiphenylmethane, naphthylene 1,5-diisocyanate, tolylene diisocyanates, such as 2,4- and 2,6-tolylene diisocyanate, N,N'-(4,4'-dimethyl-3,3'-diisocyanatodiphenyl)uretdione, mxylylene diiso-cyanate, dicyclohexylmethane diisocyanate, tetramethyl-xylylene diisocyanate, and also triisocyanates, such as 2,4,4'-triisocyanatodiphenyl ether, 4,4',4"-triisocyanatotriphenylmethane. Preference is given to the use, alone or in combination with the abovementioned polyisocyanates, of polyisocyanates containing isocyanurate groups and/or biuret groups and/or allophanate groups and/or urethane groups and/or urea groups. Polyisocyanates containing urethane groups, for example, are obtained by reacting some of the isocyanate groups with polyols, such as trimethylolpropane and glycerol, for example.

It is preferred to use aliphatic and/or cycloaliphatic polyisocyanates, especially hexamethylene diisocyanate, dimerized and trimerized hexamethylene diisocyanate, isophorone diisocyanate, dicyclohexylmethane 2,4'-diisocyanate, dicyclohexylmethane 4,4'-diisocyanate and 1,3-bis(2-isocyanatoprop-2-yl)benzene (TMXDI) or mixtures of these polyisocyanates, with very particular preference isocyanates based on hexamethylene diisocyanate and/or isophorone diisocyanate. Very particular preference is given to the use of mixtures of polyisocyanates which contain uretdione and/or isocyanurate groups and/or allophanate groups and are based on hexamethylene diisocyanate, as are obtained by catalytic oligomerization of hexamethylene diisocyanate using suitable catalysts. The polyisocyanate component (C) may, furthermore, also consist of any desired mixtures of the abovementioned polyisocyanates.

The polyisocyanate component (C) is used preferably in the form of the compounds containing free isocyanate groups, and the coating compositions are, accordingly, formulated as two-component coating materials. In this case a portion of the total solvents employed can also be added to the crosslinker component.

It is, however, also possible to formulate one component coating materials on the basis of blocked isocyanates if blocking agents having a sufficiently low deblocking temperature are used to block the polyisocyanates. Blocking agents of this kind are well known to the skilled worker and need not be elucidated further here.

The isocyanate component (C) is customarily used in an amount such that the ratio of equivalents of OH groups of the binders and, if appropriate, of OH groups of the light stabilizers to the isocyanate groups of the crosslinker lies between 1.2:1 and 0.7:1.

Furthermore, the coating composition of the invention may if desired contain further crosslinking agents as well, especially triazine-based components which crosslink with the hydroxyl groups of the binders and, if appropriate, of the light stabilizers with the formation of ethers and/or esters. In the case of the crosslinkers which react with the hydroxyl groups of the binders with formation of ethers, the compounds concerned are amino resins. Amino resins are well known to the skilled worker and are offered as commercial products by many companies. They are condensation products of aldehydes, especially formaldehyde, and, for example, urea, melamine, guanamine and benzoguanamine. The amino resins contain alcohol groups, preferably methylol groups, which are generally present in a form in which they are partly or—preferably fully—etherified with alcohols. Use is made in particular of melamine-formaldehyde resins etherified with lower alcohols, especially with methanol or butanol. Very particular preference is given to the use, as further crosslinkers, of melamine-formaldehyde resins which are etherified with lower alcohols, especially with methanol and/or ethanol and/or butanol, and which on average still contain from 0.1 to 0.25 hydrogen atoms attached to the nitrogen atoms per triazine ring.

In the case of the triazine-based crosslinkers which react with the hydroxyl groups of the binder with formation of ester groups, the compounds concerned are transesterification crosslinkers, such as preferably tris (alkoxycarbonylamino)triazine or the like, as described inter alia, for example, in EP-A-604 922.

This further crosslinking agent is customarily used in an amount of from 0 to 30% by weight, based on the weight of the isocyanate component. If, however, the coating composition is used to coat thermally sensitive substrates, it preferably contains no further crosslinking agents or only those further crosslinking agents which are also curable at low temperatures.

It is essential to the invention that the coating compositions comprise as light stabilizer a combination of d) one or more light stabilizers (L1) based on a UV absorber in an amount of at least 3% by weight, based on the coating composition, and e) one or more light stabilizers (L2) based on sterically hindered amines which are amino ether functionalized.

In accordance with the invention the light stabilizer(s) (L1) is/are present in the coating composition of the invention in an amount of at least 3% by weight. The quantitative upper limit varies depending on coating composition and is reached in all cases when an increase in the amount of light stabilizer (L1) brings about no further positive effect, but instead there is the risk that, owing to the high degree of filling, other valuable technological properties of the coating compositions will suffer. Of advantage in accordance with the invention are amounts from 3 to 10% by weight, since with all variants of the coating compositions of the invention it is possible by this means to achieve the desired effects with a comparatively low amount. Within this range, that from 3 to 7% by weight is to be highlighted. It represents the optimum in terms of the amount to be used in accordance with the invention and the effects achieved.

The ratio of the light stabilizers (L1):(L2) may vary widely and may outstandingly be adapted to the respective coating compositions. In accordance with the invention, ratios of (L1):(L2) of from 0.1 to 10 are of advantage and are therefore used with preference. Within this range, ratios of from 0.5 to 8 are particularly preferred and those from 1 to 7 are very particularly preferred.

As light stabilizers (L1) based on a UV absorber it is preferred to use light stabilizers of the benzotriazole type and/or triazine type. Examples of suitable light stabilizers (L1) are therefore the products available commercially under the following names:

Tinuvin® 384 from Ciba Geigy, light stabilizer based on isooctyl 3-(3-(2H-benzotriazol-2-yl)-5-tert-butyl-4-hydroxyphenylpropionate, average molecular weight 451.6

Tinuvin® 1130 from Ciba Geigy, light stabilizer based on the reaction product of polyethylene glycol 300 and methyl 3-[3-(2H-benzotriazol-2-yl)-5-tert-butyl-4-hydroxyphenyl]propionate, average molecular weight >600

CYAGARD® UV-1164L from Dyno Cytec, light stabilizer based on 2,4-bis(2,4-dimethylphenyl)-6-(2-hydroxy-4-isooctylphenyl)-1,3,5-triazine, average molecular weight 510, 65% strength in xylene Particular preference is given to the use as light stabilizers (L1) of immobilizable light stabilizers based on benzotriazole and/or triazine, i.e., light stabilizers containing per molecule at least 1 group which is reactive with respect to the crosslinking agent, in particular at least one aliphatic OH group.

Examples of such immobilizable light stabilizers which are used with particular preference as component (L1) are the products available commercially under the following names:

Tinuvin® 400 from Ciba Geigy, light stabilizer based on a mixture of 2-[4-((2-hydroxy-3-dodecyloxypropyl)oxy)-2-hydroxyphenyl]-4,6-bis(2,4-dimethylphenyl)-1,3,5-triazine and 2-[4-((2-hydroxy-3-tridecyloxypropyl)oxy)-2-hydroxyphenyl]-4,6-bis(2,4-dimethylphenyl)-1,3,5-triazine, average molecular weight 654, 85% in 1-methoxy-2-propanol CGL 1545 from Ciba Geigy, light stabilizer based on 2-[4-((2-hydroxy-3-octyloxypropyl)oxy)-2-hydroxyphenyl]-4,6-bis(2,4-dimethylphenyl)-1,3,5-triazine, average molecular weight 583

CYAGARD® UV-3801 from Dyno Cytec, immobilizable light stabilizer based on triazine, average molecular weight 498

CYAGARD® UV-3925 from Dyno Cytec, immobilizable light stabilizer based on triazine, average molecular weight 541

Suitable light stabilizers (L2) are all light stabilizers based on sterically hindered amines (HALS) in which the amino function is ether substituted (referred to for short in the present specification as amino ether functionalized). Particularly suitable light stabilizers (L2) are therefore amino ether functionalized, substituted piperidine derivatives, such as, for example, amino ether functionalized 2,2,6,6-tetramethylpiperidine derivatives.

Because of the amino ether function the light stabilizer (L2) has only a weakly basic character. It is therefore preferable for the light stabilizers based on sterically hindered amines that are used as light stabilizers (L2) to have a $pK_b$ of at least 9.0, preferably of at least 9.5. In this context, furthermore, preference is given to the use as light stabilizers (L2) of those sterically hindered amines which are unhydrolyzable both under the storage and application conditions and, in particular, under the service conditions of the coated substrates (especially on exposure to moisture).

Examples of products suitable as component (L2) are those obtainable commercially under the following names:

Tinuvin® 123 from Ciba Geigy, light stabilizer based on bis(1-octyloxy-2,2,6,6-tetramethyl-4-piperidyl) sebacate (average molecular weight 737, $pK_b$ 9.6), which is used with particular preference, and the corresponding light stabilizers obtainable under the name Sanol® from Sankyo.

Particular preference is equally given to the use as light stabilizers (L2) of immobilizable, amino ether functionalized light stabilizers based on sterically hindered amines, i.e, light stabilizers containing per molecule at least one group which is reactive with respect to the crosslinking agent, in particular at least one OH group. Particular preference is therefore given to the use as light stabilizers (L2) of, in particular, amino ether functionalized, substituted piperidine derivatives, such as for example amino ether functionalized 2,2,6,6-tetramethylpiperidine derivatives which contain per molecule at least one group which is reactive with respect to the crosslinking agent, in particular at least one OH group.

Examples of such immobilizable light stabilizers used with particular preference as component (L2) are also the corresponding commercially available products.

The coating composition of the invention further comprises as component (D) customary organic solvents commonly used to prepare coating materials, preferably in an amount of from 0 to 69% by weight, based on the weight of the coating composition. Usually in this case a majority of the solvents is introduced into the coating compositions through the use of the binders in the form of solutions or dispersions. Furthermore, however, further solvents may also be added in addition to the coating compositions in order to tailor the properties of the coating composition in a manner known to the skilled worker.

The coating composition of the invention preferably also contains from 0 to 5% by weight, with particular preference from 0 to 2% by weight, of one or more cellulose esters, based in each case on the solids content of the stock coating material and based on the solids content of the cellulose ester. Examples of suitable cellulose esters are cellulose nitrate, cellulose propionate, cellulose butyrate, cellulose acetobutyrate, cellulose acetopropionate, mixtures thereof, and the like. It is of course also possible to use mixtures of different cellulose esters. It is preferred to use cellulose acetobutyrate.

Furthermore, the coating composition of the invention may include further additives commonly used for the respective formulation, such as, for example, stabilizers such as antioxidants and free-radical scavengers, leveling assistants, Theological additives, etc., preferably in an amount of from 0 to 1% by weight, based on the overall weight of the stock coating material.

The coating composition of the invention is used in particular as a topcoat and with very particular preference as a clearcoat. It therefore generally comprises only transparent pigments, if any. Correspondingly, it therefore comprises—if at all—only transparent fillers.

The coating composition of the invention is generally prepared by means of mixing and, if appropriate, dispersing from the individual components.

The coatings produced using the coating compositions of the invention are notable in particular for good adhesion to plastics, even after moisture exposure, and for a simultaneously good weathering and chemical resistance coupled with good low-temperature impact strength. The invention therefore also provides for the use of the coating compositions to produce coatings having these properties.

The coating composition of the invention is used preferably to coat plastics, especially colored thermoplastics or polymer blends as are used in particular for exterior automotive components of large surface area. It is preferably used, furthermore, for the coating of plastics comprising polycarbonate, such as, for example, polycarbonate or polycarbonate/polybutylene terephthalate blends.

Alternatively, the coating composition of the invention can of course be used for other coating systems. It can therefore also be applied to other substrates, such as metal, wood or paper, for example. Application takes place with the aid of customary methods, examples being spraying, knifecoating, dipping or brushing.

Using the coating composition of the invention it is also possible to coat other primed or unprimed plastics such as, for example, ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PU, PVC, RF, SAN, PBT, PPE, POM, PU-RIM, SMC, BMC, PP-EPDM and UP (abbreviations according to DIN 7728P1). The plastics to be coated can of course also be polymer blends, modified plastics or fiber-reinforced plastics. It can also be employed for the coating of plastics which are commonly used in vehicle construction, especially motor vehicle construction.

In the case of unfunctionalized and/or nonpolar substrate surfaces, these surfaces must be subjected to a pretreatment, such as plasma or flame treatment, in a known manner prior to coating.

In the text below the invention is illustrated with reference to working examples. In these examples all parts are by weight unless expressly stated otherwise.

PREPARATION EXAMPLES 1 to 3

For the example and the comparative experiment V1, first of all the acrylate resin solution (B), the polyester resin solution (A), and the plastics sheets were prepared.

PREPARATION EXAMPLE 1

Preparation of an Acrylate Resin Solution (B)

A 4 l steel vessel equipped with monomer feed, initiator feed, stirrer and reflux condenser was charged with 382.5 parts of Cardura® E 10 (glycidyl ester of Versatic acid) and 217.5 parts of Shellsol® A and this initial charge was heated to 142° C. A solution of 47.0 parts of di-tert-butyl peroxide in 147.2 parts of xylene was added at a rate such that the addition was at an end after 4.75 h. With a delay of 15 minutes, a mixture of 250.7 parts of methyl methacrylate, 356.2 parts of styrene, 276.9 parts of hydroxyethyl methacrylate, 112.2 parts of acrylic acid and 6.6 parts of mercaptoethanol was added at a rate such that the addition was at an end after 4 h. Following the end of addition of the initiator feed, polymerization was continued at 142° C. for 180 minutes. Thereafter, the mixture was cooled to a temperature of below 100° C. and was diluted with 338.2 parts of xylene, 93.1 parts of Shellsol® A, 344.8 parts of butyl acetate and 79.6 parts of butylglycol acetate. The result was a solution of polyacrylate resin with a nonvolatiles content (60 min 130° C. circulating-air oven) of 54%, having an acid number of 7 mg KOH/g and an OH number of 137 mg KOH/g.

PREPARATION EXAMPLE 2

Preparation of a Polyester Resin Solution (A)

In a steel apparatus suitable for polycondensation reactions, 946.8 parts of 1,6-hexanediol, 299.1 parts of trimethylolpropane, 150.3 parts of phthalic anhydride, 833.8 parts of isophthalic anhydride, 270.1 parts of adipic acid and 87.5 parts of cyclohexane were weighed out and heated at a product temperature of not more than 240° C. until the mixture had an acid number <2 mg KOH/g. After the cyclohexane entrainer had been removed by distillation, the mixture was cooled to a temperature of below 100° C. and diluted with 558.6 parts of butyl acetate. This gave a solution of a polyester resin having a nonvolatiles content (60 min 130° C. circulating-air oven) of 80% and an OH number of 170 mg KOH/g).

PREPARATION EXAMPLE 3

Preparation of the Colored Polymer Blends and of the Test Sheets

The plastics sheets to be coated, comprising the yellow C/PBT blend 46023 and the red PC/PBT blend 66054, both from BASF AG, were produced in a customary and known manner by means of extrusion from the corresponding raw materials using customary stabilizers and, if appropriate, pigments and, subsequently, using the technique known as injection molding.

Example and Comparative Experiment V1

Preparation of the Coating Composition of the Example

A stock coating material was prepared, with stirring using a laboratory stirrer, from 44.8 parts of the polyester resin solution (A) from Preparation Example 2, 28.4 parts of the polyacrylate solution (B) from Preparation Example 1, 3.6 parts of a 24% strength solution of a commercially customary cellulose acetobutyrate (CAB) in butyl acetate, 1.9 parts of the commercial silicone additive Baysilon$^R$ OL 44 from Bayer AG, 12.5 parts of butyl acetate, 5.5 parts of xylene, 0.3 part of the light stabilizer (L2) Tinuvin$^R$ 123 from Ciba Geigy (bis(1-octyloxy-2,2,2,6-tetramethyl-4-piperidyl)

sebacate having an average molecular weight of 737.2 and a $pK_b$ value of 9.6) and 3 parts of the light stabilizer (L1) CGL 1545 from Ciba Geigy (2-[4-((2-hydroxy-3-octyloxypropyl)oxy)-2-hydroxyphenyl]-4,6-bis(2,4-dimethylphenyl)-1,3,5-triazine, average molecular weight 538).

The resulting stock coating material was admixed prior to its application with a 75% strength solution in butyl acetate of a commercial isocyanate based on a trimerized hexamethylene diisocyanate (Desmodur® N from Bayer AG) with stirring using a laboratory stirrer. The amount of isocyanate solution added was chosen so that the ratio of the NCO groups to the OH groups of the binders and, if appropriate, of the light stabilizers was 1:1.18.

Preparation of the Coating Composition of the Comparative Experiment V1

The example was repeated with 45.64 parts of the polyester resin solution (A) from Preparation Example 2, 28.978 parts of the polyacrylate solution (B) from Preparation Example 1, 3.695 parts of the solution of cellulose acetobutyrate (CAB), 1.971 parts of the silicone additive Baysilon$^R$ OL 44, 12.809 parts of butyl acetate, 5.616 parts of xylene, 0.138 part of the light stabilizer (L2) Tinuvin$^R$ 123 and 1.253 parts of the light stabilizer (L1) GCL 1545.

Application of the Clearcoat of the Example and of the Comparative Experiment V1

The plastics sheets described above, from Preparation Example 3, were wiped with a cloth soaked with isopropanol, prior to coating. Within a period of 2 h following the addition of isocyanate, the above-described clearcoats of the example and of the comparative experiment V1 were applied using a pneumatic spray gun with air atomization so as to give a dry film coat thickness of 32±2 µm. The liquid films were flashed off at room temperature for 10 minutes and then cured at 90° C. for 45 minutes in a forced-air oven. Thereafter the test sheets were stored at 23° C. and 50% relative humidity for 8 days. Subsequently, the adhesion was determined with the aid of the crosshatch/adhesive tape tearoff test, with the aid of the steam jet test (100 bar, 80° C., jet/surface angle 90, 10 cm) and with the aid of the manual peel test. In the case of the steam jet test, a knife is used to cut a St Andrew's cross through the coating film down to the substrate and a jet of steam is directed onto the point of intersection. Subsequently the adhesion is assessed. In the case of the manual peel test, a knife is used to make a cut in the coating film and an attempt is made to peel or scratch the coating film from the substrate.

The initial adhesion was satisfactory in all cases.

UV Weathering

The test panels were weathered in a XENOTEST 1200 instrument from Heraeus (3 air-cooled high-pressure xenon lamps each of 4 500 W; internal and external quartz filters; 3 UV specialty glass one-third dishes; synchronous, 17 min dry phase and 3 min spraying with fully deionized water). The intensity of irradiation was 70 W/m² at 300–400 nm, the black standard temperature approximately 38° C. The atmospheric humidity was >60% during the dry phase and >95% during the showering phase. The parameter evaluated was the appearance of the clearcoats, including degree of gloss and cracking.

It was found that in the inventive clearcoats on the test panels of the example there were no cracks. In the noninventive clearcoats on the test panels of the comparative experiment V1 there were a small number of visible cracks. The loss of gloss (gloss measurement at an angle of 200) was significantly lower with the test panels of the example than with the test panels of the comparative experiment V1. The color shift dE induced by UV weathering, in accordance with the CIELAB color difference formula, of the test panels was measured using an X-Rite$^R$ calorimeter from X-Rite. The color shift was reduced by 27% in the case of the test panels of the example relative to the color shift in the case of the test panels of the comparative experiment V1. Overall, the test panels of the example after UV weathering were superior in their overall visual appearance to the test panels of the comparative experiment V1.

What is claimed is:

1. A polyurethane coating composition comprising
   a) one or more polyester resins (A),
   b) one or more polyacrylate resins (B),
   c) one or more di- and/or polyisocyanates (C) having free or blocked isocyanate groups,
   d) one or more light stabilizers (L1) based on a UV absorber,
   e) one or more light stabilizers (L2) based on sterically hindered amines, and
   f) one or more organic solvents (D),
   wherein
   1.) the polyester (A) has an OH number of from 80 to 200 mg KOH/g and an acid number <10 mg KOH/g,
   2.) the polyacrylate resin (B) has an OH number of from 80 to 200 mg KOH/g and an acid number <20 mg KOH/g,
   3.) the light stabilizer (L2) based on sterically hindered amines is amino ether functionalized, and
   4.) the light stablizer (L1) is present in an amount of at least 3% by weight, based on the coating composition.

2. The coating composition of claim 1 wherein the polyacrylate resin (B) has an OH number of from 100 to 150 mg KOH/g and/or an acid number of <10 mg KOH/g.

3. The coating composition of claim 1, wherein the polyester (A) comprises in cocondensed form one or more acids selected from the group consisting of aromatic dicarboxylic acids, aromatic polycarboxylic acids, and mixtures thereof.

4. The coating composition of claim 1, wherein di and/or polyisocyanates (C) comprise one or more isocyanates selected from the group consisting of aliphatic diisocyanates, aliphatic polyisocyanates, cycloaliphatic diisocyanates, cycloaliphatic polyisocyanates, and mixtures thereof.

5. The coating composition of claim 1, wherein di and/or polyisocyanates (C) crosslink with one or more hydroxyl groups of polyester resins (A) and/or polyacrylate resins (B) to form ethers and/or esters, and are selected from the group consisting of isophorone diisocyanate, hexamethylene diisocyanate, triazine-based components, and mixtures thereof.

6. The coating composition of claim 1 comprising a mixture of polyester (A) and polyacrylate (B) comprising
   a) from 40 to 80% by weight of component (A), and
   b) from 60 to 20% by weight of component (B),
the figures being based in each case on the solids content of the resins, and the sum of the percentages by weight of components (A) and (B) being in each case 100% by weight.

7. The coating composition of claim 1, wherein the light stabilizers (L2) comprise light stabilizers selected from the group consisting of amino ether functionalized substituted piperidine derivatives, light stabilizers having a $pK_b$ of at least 9.0 and mixtures thereof.

8. The coating composition of claim 1, wherein at least one of light stabilizer (L1) and (L2) contains per molecule at least one group which is reactive with respect to the crosslinker.

9. The coating composition of claim 1, wherein light stabilizer (L1) is selected from the group consisting of benzotriazole type light stabilizers, triazine type light stabilizers, and mixtures thereof.

10. A process for preparing the coating composition of claim 1, comprising mixing and optionally dispersing the individual components.

11. A process of coating a substrate, comprising coating a substrate with the coating composition of claim 1.

12. The process of claim 11 wherein the substrate comprises a plastic.

13. The process of claim 12 comprises colored thermoplastics or polymer blends.

14. A process of producing coated substrates having good adhesion to plastics after moisture exposure and good weathering resistance and good low-temperature impact strength, comprising coating a substrate with the coating composition of claim 1.

15. The coating composition of claim 1 wherein the polyester (A) has an OH number of from 130 to 180 mg KOH/g and/or an acid number <5 mg KOH/g.

16. The coating composition of claim 3 wherein the one or more acids further comprises monocarboxylic acids.

17. The coating composition of claim 3 wherein the polyacrylate resin (B) comprises in copolymerized form glycidyl-containing esters of carboxylic acids branched on the α carbon atom.

18. The coating composition of claim 6 wherein the mixture of polyester (A) and polyacrylate (B) comprises a) from 55 to 70% by weight of component (A), and b) from 45 to 30% by weight of component (B), the figures being based in each case on the solids content of the resins, and the sum of the percentages by weight of components (A) and (B) being in each case 100% by weight.

19. The coating composition of claim 7, wherein said light stabilizers (L2) comprise light stabilizers (L2) having a $pK_b$ of at least 9.5.

20. The coating composition of claim 8, wherein said light stabilizer (L1) and/or (L2) contains per molecule at least one OH group.

21. The process of claim 11 wherein the coating is a topcoat.

22. The process of claim 11 wherein the coating is a clearcoat.

23. The process of claim 12 wherein the substrate comprises polycarbonate.

* * * * *